United States Patent [19]

Furstenberg

[11] 4,162,148
[45] Jul. 24, 1979

[54] FILTERING APPARATUS

[75] Inventor: Joachim Fürstenberg, Aichelberg, Fed. Rep. of Germany

[73] Assignee: LTG Lufttechnische GmbH, Stuttgart, Fed. Rep. of Germany

[21] Appl. No.: 875,349

[22] Filed: Feb. 6, 1978

Related U.S. Application Data

[63] Continuation of Ser. No. 725,851, Sep. 23, 1976, abandoned.

[30] Foreign Application Priority Data

Sep. 23, 1975 [DE] Fed. Rep. of Germany ....... 2542300

[51] Int. Cl.$^2$ .................... B01D 45/18; B01D 46/04; B65B 1/20
[52] U.S. Cl. ........................................ 55/272; 55/283; 55/296; 55/337; 55/399; 55/430; 141/73; 141/256; 141/286
[58] Field of Search ................. 55/210, 215, 218, 272, 55/283, 295, 296, 297, 337, 394, 398, 399, 423, 430, 432, 466; 141/10, 12, 71, 73, 256, 286; 222/413; 34/82

[56] References Cited

U.S. PATENT DOCUMENTS

| 409,025 | 8/1889 | Downton | 55/296 |
|---|---|---|---|
| 619,912 | 2/1899 | Sutcliff | 55/296 |
| 949,240 | 2/1910 | Merritt | 141/286 |
| 2,142,990 | 1/1939 | Belcher | 141/286 |
| 2,575,876 | 11/1951 | Kausch | 55/296 |
| 2,699,272 | 1/1955 | Barha | 222/413 |
| 2,871,891 | 2/1959 | Lau | 141/10 |
| 2,886,900 | 5/1959 | Flannery | 55/296 |
| 3,307,748 | 3/1967 | Dunn, Jr. | 222/413 |
| 3,500,879 | 3/1970 | Meyer | 141/286 |
| 3,790,040 | 2/1974 | Bahr et al. | 222/413 |

FOREIGN PATENT DOCUMENTS

| 2254490 | 5/1973 | Fed. Rep. of Germany | 55/432 |
|---|---|---|---|
| 823169 | 6/1936 | France | 55/398 |
| 91847 | 7/1959 | Netherlands | 222/413 |
| 1239659 | 7/1971 | United Kingdom | 141/73 |

*Primary Examiner*—Frank W. Lutter
*Assistant Examiner*—David L. Lacey
*Attorney, Agent, or Firm*—Edwin E. Greigg

[57] ABSTRACT

A filtering apparatus for the filtering of fibers and equivalent material from flowing air, and in particular for use in textile operations, has been invented in which the fiber material is firmly compacted so that as much fiber material as possible may be accommodated in a given volume of a collecting container attached to the filtering apparatus. For this purpose the filtering apparatus has a hollow fiber filtering assembly into which the flowing air is guided, a conveyor screw and a motor to drive the conveyor screw toward an outlet of the filtering assembly. The filtering assembly also includes at least one filter, with the outlet located downstream in the direction of movement of the fiber material, and at least one braking component located near the outlet which serves to brake the motion of the fiber material induced by the conveyor screw and to compact the fiber material firmly.

24 Claims, 11 Drawing Figures

FILTERING APPARATUS

This is a continuation of application Ser. No. 725,851 filed Sept. 23, 1976, now abandoned.

BACKGROUND OF THE INVENTION

This invention pertains to a filtering apparatus for the filtering of fibers and equivalent materials from flowing air. The filtering apparatus has a hollow fiber filtering assembly into which the air to be filtered is guided, and which air flows through at least one filter disposed at the circumference of the fiber filtering assembly, where the air once again flows out. A driven conveyer component is located inside the fiber filtering assembly, which conveyer component conveys the filtered fiber stock in the path traveled by the helix there being at least one outlet for the filtered fiber stock located adjacent to the terminus of the helix.

Filtering apparatuses, to which the invention relates, serve in particular for the filtering of textile fibers, thread remnants, and equivalent materials, as they are produced through syphoning in spinning plants, knitting plants, weaving plants and similar textile operations, without restricting the invention hereto.

In a well known filtering apparatus of this kind, as disclosed, for example, in U.S. Pat. No. 2,713,921, a cylindrical filter is provided, within whose interior is located a mechanical rotating scraper in the form of a screw-like wound coil. The fiber material scraped from the filter falls into a collecting chamber. It is disadvantageous among other factors, that the fiber material is not compacted, so that it is very voluminous, and the collecting chamber must be emptied often, the emptying process additionally being unpleasant.

Hence, it would be desirable in such filtering apparatuses, where relatively large quantities of fibers are filtered, that the fiber material be strongly compacted (compressed), so that as much fiber stock as possible may be accommodated in the given volume of the collecting container attached to the filtering apparatus, and that the emptying of the collecting container need not occur at short intervals of time. This compacting also facilitates the possible further processing of the filtered fiber stock.

Filtering apparatuses have already become well known, which possess means to compact the filtered fiber material immediately and automatically, and yet the well known apparatuses of this kind, as disclosed, for example, in German Pat. Nos. 1,510,317 and 1,921,950, can only clean the filter discontinuously, and can only compact the herein obtained fiber stock discontinuously. This discontinuous working method causes the pressure drop of the air flowing through the filtering apparatus to fluctuate at the filter to a considerable extent, and causes corresponding fluctuations in the flow of the conveying air current, which is usually undesirable and in many cases also very disadvantageous. In addition, in these well known apparatuses the filter surface can only be relatively small with respect to the exterior dimensions of the housing, which fact is also disadvantageous.

OBJECTS AND SUMMARY OF THE INVENTION

It is, therefore, a principal object of the invention to provide a filtering apparatus which makes it possible to compact the filtered fiber stock continuously and extensively, and which thus also makes it possible, at least in preferred forms of the embodiment, to clean the filter continuously.

This and other objects are achieved according to the invention by the provision of an apparatus such as noted above in which the conveyer component is a conveyer screw, and in which the rear region of the fiber filtering assembly is provided with at least one braking component for the braking of the motion of the filtered fiber stock, caused by the motion of the conveyer screw, for the compaction of the fiber stock.

Since it is possible to drive the conveyer screw continuously without difficulty, it can compact the filtered fiber stock continuously and extensively. It is also possible to convey the filtered fiber stock continuously without difficulty to that region wherein it is compacted, so that the entire filter is also being cleaned continuously. As a result of this fact, no disturbing pressure fluctuations of the air flowing through the filter any longer appear, and the filtering apparatus is suitable for applications where it is important that the air carrying the fibers to be filtered flow at an approximately constant chronological volumetric rate. It can be preferably provided, that the conveyer screw simultaneously serves for the cleaning of the filter, through which provision results a continuous cleaning of the filter, and a continuous compacting of the filtered fiber stock by the simplest means. Although this preferred provision is included, the invention is not restricted thereto, since it is also possible to perform the cleaning of the filter by means of one or several separate scrapers. Thus it can, for example, be appropriate in many cases to perform the cleaning of the filter by means of a second conveyer screw, which serves as the scraper, and which precedes the other conveyer screw performing the compaction of the scraped fiber stock, and which second conveyer screw is driven at another rotational velocity, preferably a higher rotational velocity than that of the conveyer screw serving for the compaction. Alternatively, the second preceding conveyer screw can feature a different pitch from that of the conveyer screw serving for the compaction.

Other means for the scraping of the fiber stock from the filter and for the conveying of this fiber stock to the conveyer screw performing the compaction can be provided; as, for example, by scrapers which execute axial stroke movements, whereby it is possible, due to the continuous compaction, to perform without difficulty the axial stroke movements uninterruptedly so that a continuous cleaning of the filter with all the advantages obtained herefrom may similarly take place.

According to the invention, however, the apparatus is not restricted to a continuous compaction of the fiber stock, since such a conveyer screw can also be driven intermittently, for example, when only relatively little fiber stock is produced during any given time interval, and thus a discontinuous operation becomes adequate or appropriate.

The filtering apparatus, according to the invention, is preferably intended for applications wherein relatively large quantities of fibers are normally to be filtered in a given period of time, so that a continuous operation is particularly advantageous and appropriate. A preferred application consists in the subsequent placement of the filtering apparatus, according to the invention, behind a preceding filtering apparatus, at which the fibers are filtered, for example, at a cylindrical filtering drum, and are continuously syphoned off the filtering drum by means of a suction jet from the main air current. The suction jet may, for example, be the exhaust air from the machine hall flowing to a climate center, so that the air current conveying the herewith syphoned off fibers is substantially smaller than the main air current, and, thus, the fibers contained in the smaller air current are, to a considerable extent, concentrated. Another preferred field of application can be pneumatic exhaust systems for spinning machines such as ring spinning machines, flyers, carding machines, stretching machines and so forth, at which relatively large quantities of fibers, thread remnants, or equivalent materials are likewise syphoned off in any given time interval, and for which it is likewise important that the air quantity which carries the fibers and is syphoned off in any given time interval fluctuates as little as possible. Here the problem of the removal of fibers filtering assembly in the associated filtering apparatuses by means of compaction was not at all solved as yet, since here no appreciable fluctuations of the air volume which flows through the filter per unit time can be tolerated.

The braking component or components of the fiber filtering assembly have the purpose of preventing the synchronous rotation of the fiber stock then in the process of compaction, respectively the compacted fiber stock with the revolutions per unit time of the conveyer screws. They also serve to brake the axial motion of the fiber stock relative to the axis of the conveyer screw, so that the desired compaction can occur. In many cases it is sufficient for this purpose if the braking component only causes the fiber stock to rotate slower than the conveyer screw which compacts it. It is, nevertheless, more propitious with a view toward particularly high and uniform grades of compaction to construct at least one braking component in such a manner as to protrude into the fiber stock to be compacted, or into the compacted fiber stock, thus physically preventing the co-rotation of the fiber stock with the conveyer screw and, where applicable, to resist the axial motion of the fiber stock. For this purpose, at least one braking component can be provided which is constructed as a projection reaching from the inner circumference of the fiber filtering assembly to the proximity of the conveyer screw. In like manner, at least one braking component can be a projection at an inner face of the fiber filtering assembly, wherein this inner face can also constitute a braking component for the braking of axial motion.

The projections forming the braking component or components can be usefully constructed to possess a flat surface, at least on that side which is directly acted upon by the fiber stock conveyed by the conveyer screw, wherein it is especially useful that this flat "braking surface" extends approximately within a plane paralleling the rotational axis of the conveyer screw. However, by tilting this braking surface with respect to the cited plane determined by the rotational axis of the conveyer screw, one can, where necessary, influence the compaction to some other desired extent, whether it be for even greater compaction or for less compaction, according to which requirement this braking surface is tilted in the appropriate direction with respect to the cited plane.

The effective braking surfaces of the braking component can also, in some cases, advantageously be, for example, curved, corrugated, or equivalently shaped, rather than flat. In general, it is useful that the braking surface be smooth so that fibers will not catch on it for long. However, where appropriate, braking surfaces that are not smooth can also be provided.

To obtain as short an axial length of the fiber filtering assembly as possible, it is appropriate that one or several such braking components be provided at a filtering surface, or that the filtering surface, that is at least one section of the filtering surface, itself serves as the braking surface.

Although it is normally adequate and advantageous in the compaction of the fiber stock to limit the motion of the conveyer screw to an exclusively rotational motion, it can be advantageously provided in many cases that the conveyer screw also performs axial stroke movements. This can be provided by having the conveyer screw perform the axial stroke movements periodically or at predetermined time intervals, with which provision an even greater compaction of the fiber stock is achieved in many cases. The possible use of axial stroke movements performed by the conveyer screw can also serve to evoke an axial stroke movement against a restoring force during excessive congestion of the fiber stock, and thereby to activate a sensor which closes a current circuit which can preferably serve to reverse the direction of rotation of the conveyer screw briefly, thus eliminating the congestion. The sensor can, if need be, also trigger one or several other functions, for example, an alarm signal for an attendant. It can be provided for the same purpose either alone or in conjunction with the measure cited earlier that the propulsion motor of the conveyer screw be mounted such as to revolve in its entirety about its axis under the restriction of an opposing restoring means so that during excessive propulsive torque, which is indicative of excessive loading or congestion of the fiber stock, a turning of the propulsion motor in its entirety is provoked, through which turning a sensor is activated, which similarly closes a current circuit, which in turn triggers the same function or functions triggerable by the other cited current circuit.

The filter of the filtering apparatus can be usefully constructed as a perforated metal plate. However, in some cases other configurations such as woven metallic sheets, perforated ceramic bodies, filter hoses, and so forth, can also be employed.

It is preferably provided that the braking component or components are stationarily disposed. However, it is also possible in some cases at least to have one braking component rotatably supported, and driven either continuously by means of an electric motor or alternately driven and not driven, for example, by means of a stepping switch device activated by a solenoid or by equivalent means. Such a rotatably driven braking component should not, of course, rotate synchronously with the conveyer screw, but rather must rotate slower in the same direction of rotation, or rotate in the opposite direction whereby various desired grades of compaction are selectable by means of adjusting that rotational velocity of the braking component. It is also conceivable not to drive this kind of rotatably supported braking component, but rather to let it be rotated by the turning moment originating at the conveyer screw and acting on the braking component through the compacted fiber stock, and therein to brake it such as to cause it to rotate slower than the conveyer screw, wherein the brake can, if necessary, be part of a regulator circuit, in order to constrain the braking component to rotate at a predetermined adjustable rotational velocity by means of variable braking. Such a braking component can feature, for example, a ring plate which covers a ring slit in a face of the fiber filtering assembly, and which is rotatably supported axially relative to the conveyer screw and which possesses projections which engage axially with the compacted fiber stock and thus cause the given compacted fiber stock to rotate at the rotational velocity of this braking component, wherein this braking component also brakes the axial motion of the fiber stock deflecting it toward the outlet.

In general, a single outlet can advantageously be provided for the fiber stock leaving the fiber filtering assembly, which outlet can preferably be constructed as a central circular hole in a membrane serving for the closure of the rearward end face of the fiber filtering assembly. The rim of the hole lies against a body which preferably penetrates the hole, which rim can be lifted as a result of the elasticity of the membrane from this body by means of the pressure caused by the conveyer screw, thus opening the outlet. The body penetrating this hole can preferably be the free end of the shaft of the conveyer screw, or a component firmly attached to this shaft, or it can, in many cases, also be stationarily disposed, or rotatably supported and driven or braked, independent of the conveyer screw. In a preferred form of the embodiment, this component can be a hub carried by spokes, wherein the spokes can be located inside or outside of the fiber filtering assembly, which spokes can also form braking components.

In another preferred form of the embodiment, the outlet is formed by a ring slot in the corresponding face of the fiber filtering assembly, closable by means of a membrane, wherein the membrane forms the inner boundary of the ring slot.

It is also possible, and in some cases appropriate, to arrange the outlets or at least one outlet for the fiber stock peripherally relative to the fiber filtering assembly.

It can be preferably provided that the conveyer screw also pushes the compacted fiber stock through the outlet of the fiber filtering assembly. It is especially useful if the conveyer screw performs this task solely by rotating and without making axial stroke movements. However, if required, axial stroke movements can be also provided hereto, whether it be for the independent expulsion of the fiber stock from the outlet, or to aid further in the expulsion of the fiber stock already implemented by the rotational motion.

It is also possible, while normally not appropriate, to undertake the expulsion of the compacted fiber stock from the fiber filtering assembly by means of a separate ejector performing an axial stroke movement, for example, by means of a ram possessing barbed teeth and being driven to perform axial stroke movements, which ram impels the compacted fiber stock only in the direction of the outlet, due to the shape and appropriate orientation of the teeth, expelling it through the outlet, and yet can thus be moved back upwards without carrying along any of the fiber stock, to perform still another expulsion stroke.

DESCRIPTION OF THE PREFERRED EMBODIMENTS

Figure 1:
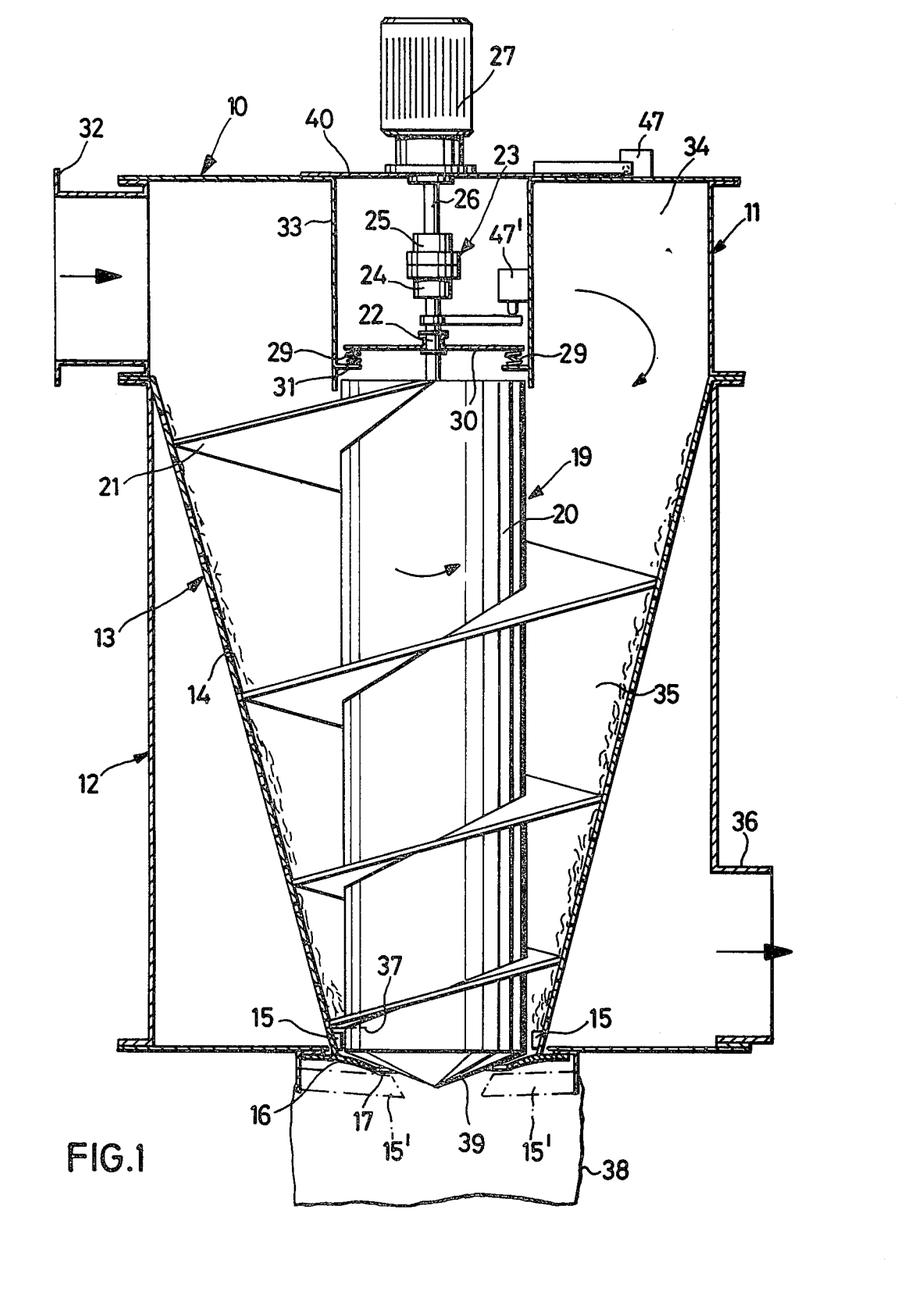
FIG. 1 illustrates a filtering apparatus according to a first exemplary embodiment of the invention, wherein the fiber filtering assembly and the housing are shown in longitudinal cross section.

The filtering apparatus according to FIG. 1 has an exterior housing 10, which consists of a cap-shaped air inlet component 11 and a kettle-shaped main housing component 12 containing an air outlet 36. The main housing component 12 contains a fiber filtering assembly 13, which consists of a rotationally symmetrical, downward tapering, truncated conical filter 14, a rim of strip-shaped braking components 15, and a membrane 16. The membrane 16 has a round hole 17 which forms the outlet for the filtered and compacted fiber stock. The membrane 16 is located at the lower end face of the filter 14, and can be made of an elastic metal, rubber, flexible synthetic material, or an equivalent material. A conveyer screw 19 is disposed in the interior of the filter 14 of the fiber filtering assembly 13. The thread of the conveyer screw lies circumferentially adjacent to the filter 14 appropriately constructed of perforated sheet metal, wherein the hollow cylindrical shaft 20 of the conveyer screw 19 carries thread 21, and possesses a large diameter which is only slightly smaller than the inside diameter at the smallest circumference of the filter. A shaft trunnion 22 is coaxially attached to the shaft 20, which shaft trunnion is carried rotationally fixed but axially movable within the output component 24 of an electromagnetic coupling 23, whose input-side component 25 is attached to the motor shaft 26 of an electric motor 27 serving for the propulsion of the conveyer screw 19. Thus, the conveyer screw 19 can perform axial stroke movements relative to the coupling 23. The weight of the conveyer screw 19 is partly relieved by means of pressure spring means 29 acting against the bottom of a plate 30 rotatably affixed to the shaft trunnion 22, which pressure spring means are disposed upon a stationary abutment 31, so that the conveyer screw 19 rests with only a part of its weight on the filter 14. The remaining part of its weight is supported in the axial direction, so that the thread 21 of the conveyer screw 19 grazes or touches lightly the filter 14, conveying the fibers filtered at its inner side in the direction of the membrane 16 and along it to the outlet formed by the hole 17 of the membrane 16 for the filtered fiber stock, wherein the membrane 16 brakes the axial motion of the fiber stock and thus also forms a braking component causing the compaction of the fiber stock in cooperation with the braking components 15.

The air inlet duct 32 is disposed at the circumference of the air inlet component 11, and preferably communicates tangentially with an annular chamber 34, formed internally by a hollow cylinder 33 in the air inlet component 11, so that the entering air flow is forced into rotation, namely in such a way as to rotate in an opposite sense relative to the direction of rotation of the conveyer screw 19. This construction guarantees an air current inflow meeting a low resistance into the spiral chamber 35. The air flow is dimensionally bound by the thread 21 of the conveyer screw 19, and flows through the upper open end face of the filter 14. The air to be filtered then flows through the holes of the filter 14 from the inside to the outside, whereby the fibers and the other coarser contaminants are filtered. The filter 14 is therein preferably constructed in such a way as to permit the throughflow of dust so as to filter the fibers without any interposing dust. The dust can then be filtered later in a conventional dust filter. The clean air liberated from the fibers then flows to the air outlet 36 located at the circumference of the main housing component 12 in the proximity of its lower end face, and flows through the air outlet 36 and out of the housing 10. The air can be conducted through the filtering apparatus both by blowing and by suction.

The conical configuration of the filter 14 possesses many advantages relative to cylindrical filters, for example, in a cylindrical filter air enters through its front face and as a result a static pressure is built up due to the decrease in the velocity of the air in the direction of the other end face of the filter, which static pressure causes the major part of the air to leave the filter in the proximity of this other end, to the effect that the throughflow through the filter is unevenly distributed. This effect is avoided by the conical configuration of the filter 14, so that an even throughflow through the filter at all its points is achieved. The conicity of the filter can be selected preferably such as to cause the throughflow through the filter to be larger per unit of filter surface area at the end having the greatest diameter, and to cause the throughflow per unit of filter surface to diminish in the direction toward the other end, so that the end region of the filter, neighboring the outlet for the fiber stock and serving for the compaction of the fiber stock, is no longer strongly acted upon by the flowing air even when the filter is still empty. Consequently, a nearly even pressure drop of the air at the filter is always obtained from the beginning of the operation on. It will be observed that the concept of the invention has utility with conical filters as well as considerable advantages with other types of configurations of the filter.

The thread 21 of the conveyer screw 19 ends at 37 in the clearance above the membrane 16, and in the region between this lower end 37 and the membrane 16 the braking components 15 are located at the inner wall of the filter 14. The braking components 15 are constructed in the form of radically inwardly directed strips extending in the direction of the surface lines of the filter, and reaching close to the circumference of the shaft 20, so that no rotation of the fiber stock conveyed to the bottom by the conveyer screw 19 can take place within the region of the braking components 15. Eight such braking components 15 can, for example, be distributed around the circumference of the shaft 20, wherein an equal angular distance between the adjacent braking components is maintained. The braking components 15 thus prevent the rotation of the compacted fiber stock, and the membrane 16 effects the axial braking of the fiber stock. If necessary, the axial braking can also be effected by the face of at least one other rigid, braking components. The braking components 15 also effect the axial braking with their upper surfaces, and this function can be further amplified by broadening these braking components 15.

Since the filtered fiber stock consists of fibers that are tangled with each other and thus possesses a compact consistency, the braking effected by the braking components 15 also acts upward against the thusly interconnected fiber stock which is continually being conveyed downward, so that it too does not rotate, and is hence continually pressed downward and compacted by the rotation of the conveyer screw 19. Thus, a strongly compressed and compacted fiber mass, whose cohesion is increased by the mutual entanglement of the fibers, forms in the lower region of the filter 14, which fiber mass also contains the other filtered coarser contaminants such as shell remnants or equivalent materials, and which is continually pressed axially against the membrane 16 through the rotation of the conveyer screw until, at sufficiently large pressures, it bends the membrane downward, thus opening the outlet 17. The membrane 16 thus offers a considerable resistance to expulsion of the fiber mass, in order to intensify substantially the compaction of the fiber stock, and the membrane also deflects the fiber stock into the outlet 17. The fibers or equivalent materials filtered further upward within the filter need not yet possess a compact consistency, since they are continually conveyed downward by the conveyer screw even when they are moving in the direction of the circumference of the filter 14, since that motion occurs in every case at a lesser rotational velocity than that of the conveyer screw, because these fibers are constantly flung toward the filter 14 by the air flowing through the filter, and their axial motion is thus also braked.

It is also an advantage of this filtering apparatus that optimally large filters can be accommodated for any given proportional housing dimensions, so that it can filter very large air quantities per unit time, and hence is extremely efficient.

The propulsion motor 27 can drive the conveyer screw 19 preferably continuously, so that the filter 14 is cleaned continuously and practically no pressure fluctuations of the air flowing through the filter are produced by the fiber stock filtered at the filter 14, and thus a uniform air throughput is achieved at a minimal propulsive output for the conveying of the air, which is extremely advantageous.

The free lower end face 39 of the conveyer screw 19 is conically constructed, and protrudes through the membrane opening 17, wherein the membrane 16 is pressed downward by this cone-shaped end 39, so that so long as no compressed fiber stock is present between the membrane 16 and the cone-shaped end 39 of the shaft 20, the membrane lies snugly against this end 39 of the shaft 20 and therewith forms an air-tight closure.

If, during operation, the fiber stock is continuously pressed into the outlet 17, the fiber stock presses the membrane 16 downward and thereby fills the ring slot created between the membrane 16 and the end face 39 of the shaft 20 tightly, so that no air can flow from the outlet 17, irrespective of the fact that compressed fiber stock is then also still present above the outlet 17, where it acts like a stopper.

The compacted fiber stock forms a strongly compressed fiber mass, which, after leaving the outlet, does not increase its own volume, or increases it relatively little, so that compressed fiber stock collects in the collecting sack 38 hanging beneath the outlet 17 of the housing. As a result, the sack 38 can hold large quantities of filtered fiber material without the requirement of any additional compaction devices.

In some cases the depicted braking components 15 can also be omitted, namely when the compacted fiber stock is prevented from rotating synchronously with the conveyer screw 19 by the filter 14, and/or by the membrane 16, that is to say, when the membrane 16 and/or the filter 14 alone suffice to serve as the braking components. However, it is better to provide braking components, such as 15, which protrude into the compacted fiber stock.

As a result of the cohesion of the compacted fiber stock, it is in many cases also possible and appropriate to place braking components outside of the fiber filtering assembly 13 beneath its outlet, as indicated in FIG. 1 by the dash-dotted lines. The rim of radial strip-shaped stationary braking components 15', whose radial orientation is relative to the conveyer screw, protrude under the outlet opening 17 to a proximity with the end face 39 of the shaft 20. As a result, the components 15' prevent the rotation of the fiber stock leaving the outlet 17. This retardation of the rotation of the fiber stock is also propagated through the outlet 17 to the interior of the fiber filtering assembly 13, in consequence of the cohesion of the fiber stock, such that here too a braking sufficient for an intensive, uniform compaction of the fiber stock is achievable. Where appropriate, the braking components 15 and 15' can be provided in combination.

Figure 2:
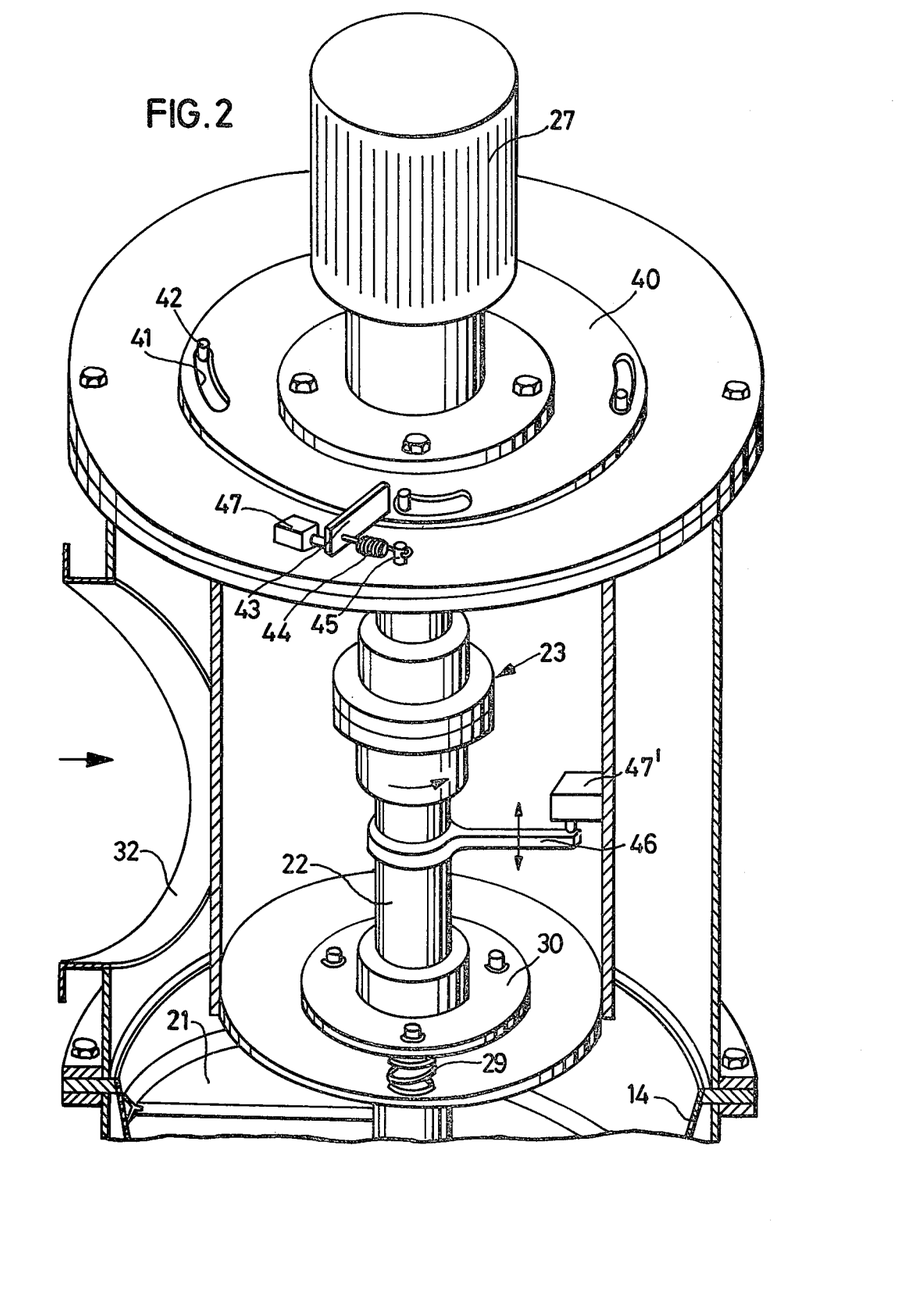
FIG. 2 illustrates a perspective and partially cross-sectional view of the conveyer propulsion unit for the conveyer screw of the filtering apparatus, according to FIG. 1.

The propulsion unit of the conveyer screw 19 is graphically represented in an enlarged view in FIG. 2. The electric motor 27 is mounted on a disc 40. The disc 40 has several slots 41 extending in a circumferential direction, which slots are penetrated by bolts 42 attached to a stationary plate, so that the disc 40 carrying the motor 27 can rotate restrictedly. A tension spring 44, held by a support 43 attached to the disc 40, is mounted with its other end on a stationary bolt 45, and thus urges the disc toward the view depicted in FIG. 2 which corresponds to the normal operational position. When the torque delivered by the motor exceeds a predetermined value, as may be called forth by an unacceptably severe congestion of the fiber stock 14, by a jamming of the conveyer screw in the filter 14; then the disc 40 rotates in opposition to the restoring force of the spring 44, and thus actuates a stationarily disposed electrical switch 47, which closes a current circuit which triggers a suitable action, for example, switching off of the motor 27 and triggering of an alarm signal to summon an attendant, or of reversing the rotational direction of the motor shaft. In the last case, the conveyer screw then rotates clockwise as viewed from its top, thereby transporting the congested fiber stock upward so that this congestion is loosened, wherein a timing switch can be provided which once again switches the propulsion motor 27 to its normal rotational shaft direction after a preselected period of time. In this manner, excessively severe congestion can be loosened automatically, whether it be through a single, or through a repeated reversal of the rotational direction of the motor 27.

A further safety feature is additionally provided in this filtering apparatus, for the loosening of a congestion, which functions through the actuation of a stationary switch 47' by a rod 46 attached to the shaft trunnion 22. When the conveyer screw 19 is pressed axially upward due to a congestion, which can, for example, occur when the sack 38 is full. This switch 47' can also either switch the motor 27 off and trigger an alarm, or else reverse the rotational shaft direction of the motor 27. For this purpose the rod 46 is mounted in a conventional manner to the shaft 22 so that it is retained in alignment with the switch 47'. Alternatively, the rod 46 could be a plate which rotates with the shaft 22.

Figure 3:
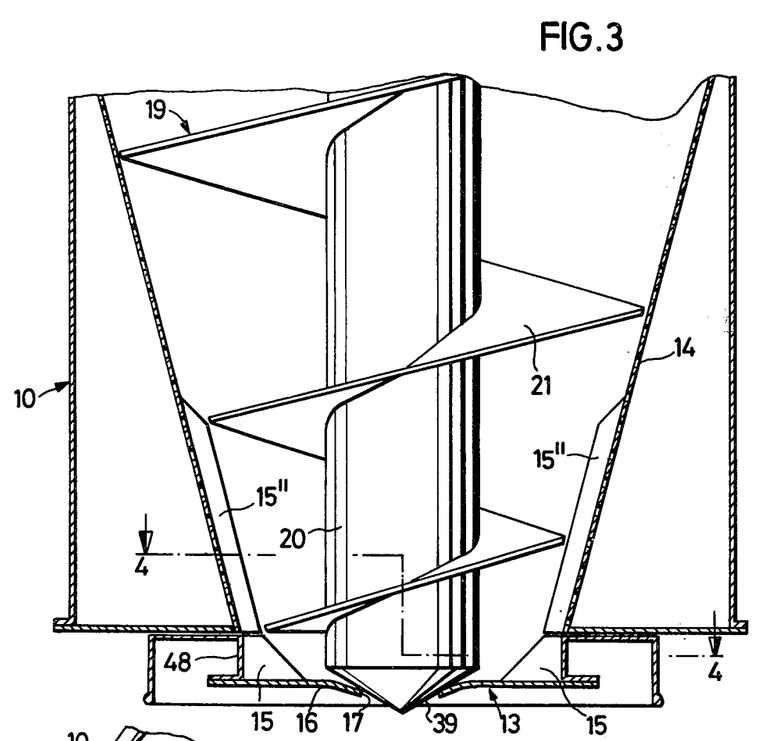
FIG. 3 illustrates an enlarged cross-sectional representation of a variation of the embodiment of FIG. 1.
Figure 4:
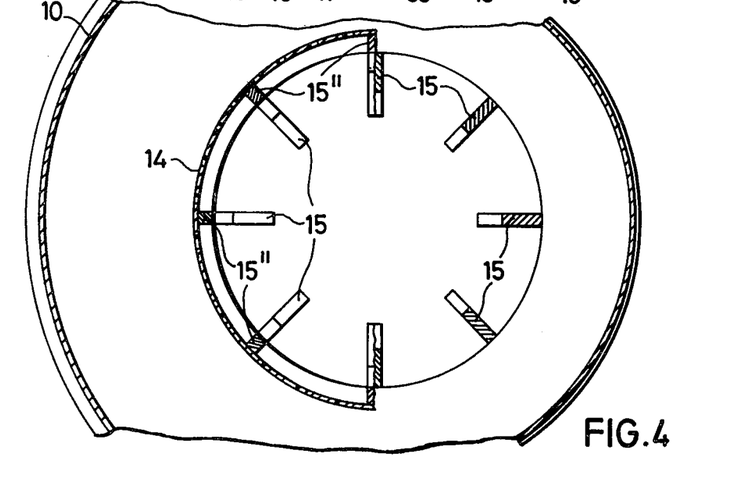
FIG. 4 is a cross-sectional view taken along the lines 4—4 in FIG. 3, wherein the conveyer screw and the membrane are, however, omitted.

The exemplary embodiments according to the FIGS. 3 and 4 can, with the following differences, correspond to the filtering apparatus according to FIGS. 1 and 2. The differences consist in the fact that the diameter of the shaft having the thread 21 of the conveyer screw 19 is substantially smaller than the diameter of the lower end of the conical filter 14 of the fiber filtering assembly 13, and further that a cylindrical housing component 48 is coupled to the lower end face of the filter 14, and that two rims of radial and axially extending plate-shaped braking components 15, 15" are arranged in the interior of the fiber filtering assembly 13. The screw thread 21 ends at the lowest face surface of the filter 14. The upper braking components 15" end at this lowest face surface. These braking components 15" are attached to and extend along the lower section of the filter 14, reaching inward almost to the thread 21 of the conveyer screw 19, wherein the diameter of the thread 21 is correspondingly decreased within the region of the braking components 15", since they must not engage with the threadways of the conveyer screw 19 because the rotation of the conveyer screw does not permit it.

The other rim of similarly radial plate-shaped braking components 15 extending axially in the direction of the conveyer screw is located in the lower, cylindrical part of the housing 12, and in this preferred exemplary embodiment a considerable distance is provided between these braking components 15 and the radially proximate and cylindrical region of the shaft 20 of the conveyer screw 19, wherein each intervening space between these braking components 15 and the shaft 20 possess an approximately triangular shape, in such a manner that this intervening space tapers from top to bottom, which has been shown to be particularly favorable. The outlet 17 is again formed by a hole in the membrane 16. The membrane can, for example, consist of a rubber sheet having a thickness of a few millimeters, which sheet can be reinforced by cloth.

So long as no fiber stock is present in the outlet 17, the membrane 16 lies air-tight against the likewise conical end face 39 of the shaft 20 of the conveyer screw 19. As soon as the fiber stock is pressed into the outlet, the membrane 16 bends correspondingly downward to open the outlet, and always serves to assure that the compressed fiber stock is pressed through the outlet 17, which fact further increases the compaction effect of the conveyer screw. These braking components 15, 15" retard particularly intensively the rotation of the compacted fiber stock, wherein as a result of the relatively long braking components 15" inside the filter 14, the fiber stock is hindered directly by these braking components 15" in its rotation, up to the corresponding level in the fiber, so that even under unfavorable conditions practically no rotation of the compacted fiber stock can take place. In this exemplary embodiment, each rim of braking components 15, 15" has eight braking components, as seen in FIG. 4. In addition, the braking components 15, 15" which are grouped one above the other group, are also paired and aligned axially, which is useful. However, in a given case, the two rims of braking components 15, 15" can be respectively offset angularly, and/or possess mutually differing numbers of braking components.

Although, as mentioned, it is particularly advantageous to construct the filter in the form of a cone, other configurations of the filter can be provided. Thus, in the exemplary embodiment according to FIG. 5, the filter 14' of the fiber filtering assembly 13 is cylindrical and is clamped at its top by a flange between an air inlet component 11 and a main component 12 of the housing 10. The embodiments according to FIGS. 1-4 are valid for the housing 10 and the propulsion of the conveyer screw 19 in the embodiment according to FIG. 5. In this exemplary embodiment, the membrane 16 lies against a flat surface 39' of the shaft 20, so long as the membrane is not pressed down by fibers. In this exemplary embodiment part of the weight of the conveyer screw 19 is similarly relieved by means of a weight relieving device, and so the conveyer screw can be supported by the membrane, or it can be provided that the lower axial terminal position of the conveyer screw 19 be determined by means of an axial pressure bearing located in the output component 24 of the coupling 23. The partial relieving of the weight of the conveyer screw 19, effected by the spring means 29, serves in particular to insure that the conveyer screw 19 moves upwardly during an axial congestion of the fiber stock so that actuation of the switch 47' can occur. This actuation occurs sooner than would be the case in the absence of weight relieving.

Figure 5:
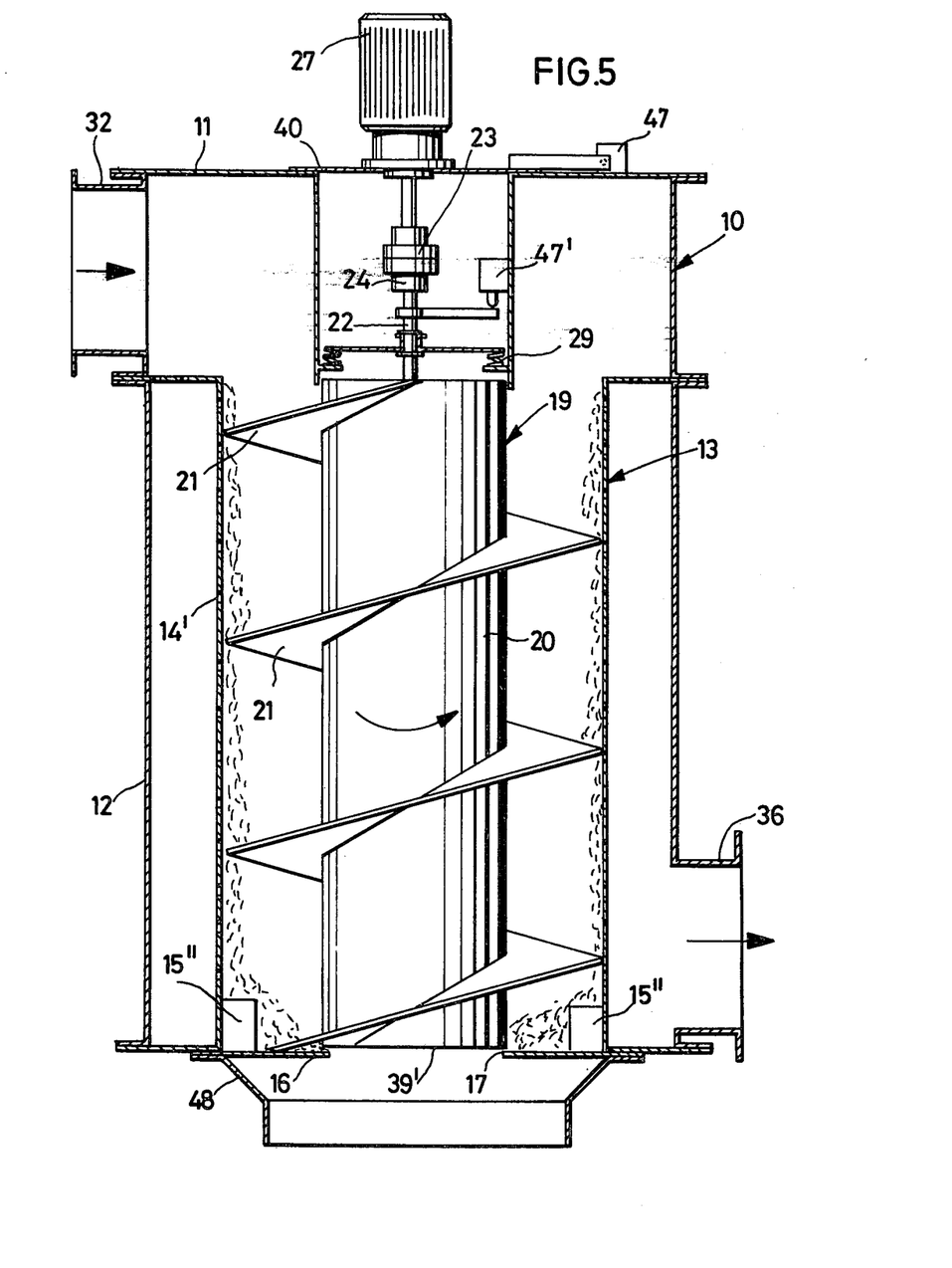
FIG. 5 illustrates another exemplary embodiment of the invention in a representation corresponding to FIG. 1.

In this exemplary embodiment, inwardly directed plate-shaped braking components 15" reaching almost to the screw thread 21 are likewise provided within the filter 14' along its lower end region. The diameter of the applicable thread region of the thread 21 is correspondingly decreased in the region of the braking components 15". In addition, the screw thread extends almost to the membrane 16 in this exemplary embodiment, which fact can be useful especially during very large fiber yields.

The braking components 15, 15' and 15" in this and the other exemplary embodiments need not necessarily be constructed in the form of strips or plates, but can rather also possess other suitable shapes. Also the plates or strips forming the braking components need not in all cases extend radially, that is along surface lines of the cylinder. Rather, they can, if need be, be angularly inclined relative to the diametric planes of the conveyer screw and thus likewise effect a good braking of the fiber stock.

Figure 6:
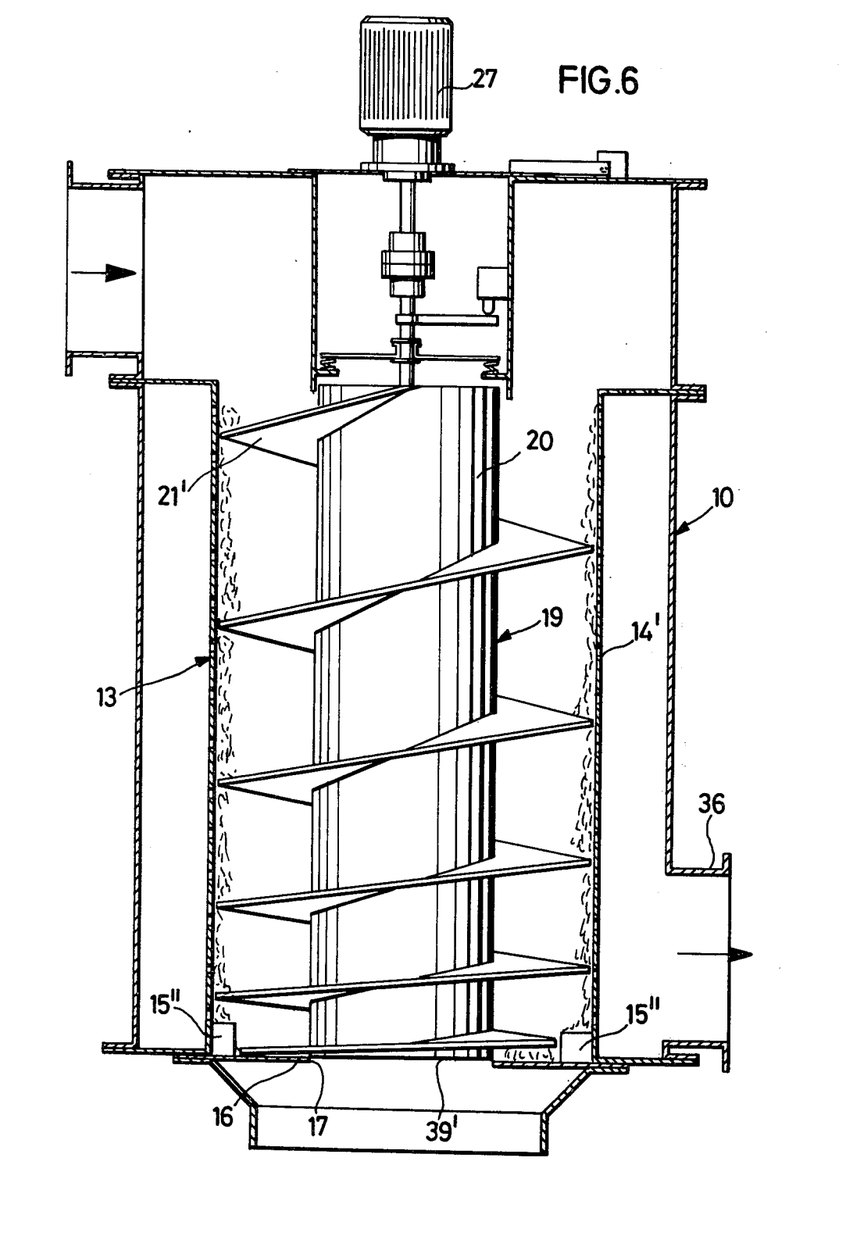
FIG. 6 illustrates a variation of the filtering apparatus according to FIG. 5 in a corresponding representation.

In the preceding exemplary embodiments, the conveyer screw 19 had respectively a thread 21 of constant pitch. However, in many cases threads of varying pitch can be provided, as depicted in the example according to FIG. 6. This exemplary embodiment according to FIG. 6 differs with the one according to FIG. 5 due to the fact that the pitch of the thread 21' of the conveyer screw 19 is not constant, but rather decreases uniformly in the direction of the outlet 17 of the fiber filtering assembly 13. With a decreasing pitch, the axial conveying velocity of the conveyer screw 19 correspondingly decreases uniformly in the direction toward the outlet 17. This is often advantageous, since the delivery of the fibers filtered at the filter 14' to the compaction zone for the fiber stock, created by the braking components 15" and the membrane 16, therefore takes place at a velocity which decreases in the direction of that compaction zone, and since thus the fiber stock is correspondingly compacted still more, due to the fact that it is expelled from the outlet 17 at a lower velocity.

The filtering apparatuses described above are suitable, among other uses, for filtering systems wherein they follow preliminary filters.

On the other hand, both of the filtering apparatuses illustrated, according to the invention, in FIGS. 7-11 serve preferably for the direct filtering of air in pneumatic exhaust systems of spinning machines. They feature, respectively, a box-shaped housing 10' containing a ventilator 50 which conveys the air to be filtered, and which can be the only ventilator of the given particular exhaust system, and which is a suction ventilator. These filtering apparatuses are thus preferably intended for the purpose of both exhausting the air at spinning machines with exhaust systems, as well as of filtering and automatically compressing the fibers, thread remnants, and equivalent materials, carried by the exhausting air, and to deposit them in a respective collecting chamber 51 in the housing 10'. One can also designate these filtering apparatuses as being filtering boxes.

Figure 7:
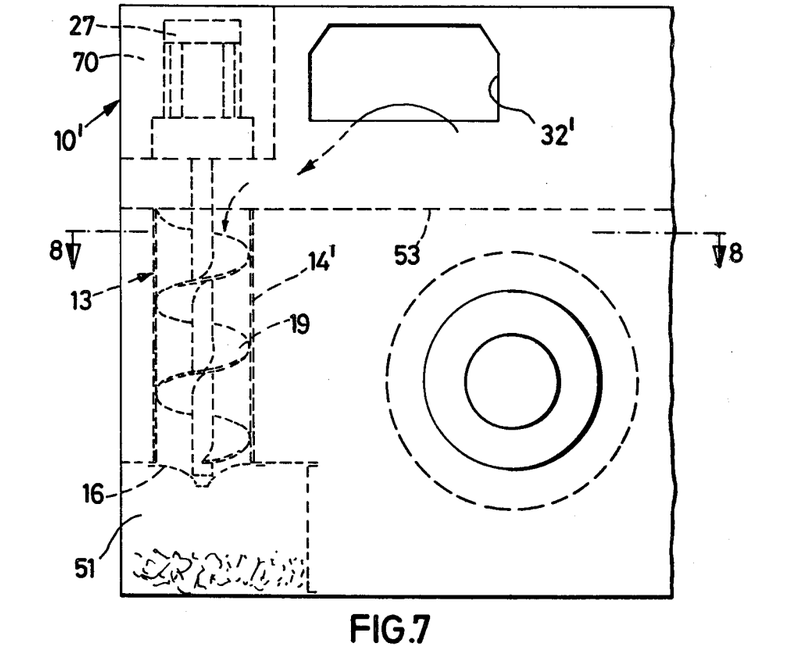
FIG. 7 illustrates a rear view of a further exemplary embodiment of a filtering apparatus according to the invention.
Figure 8:
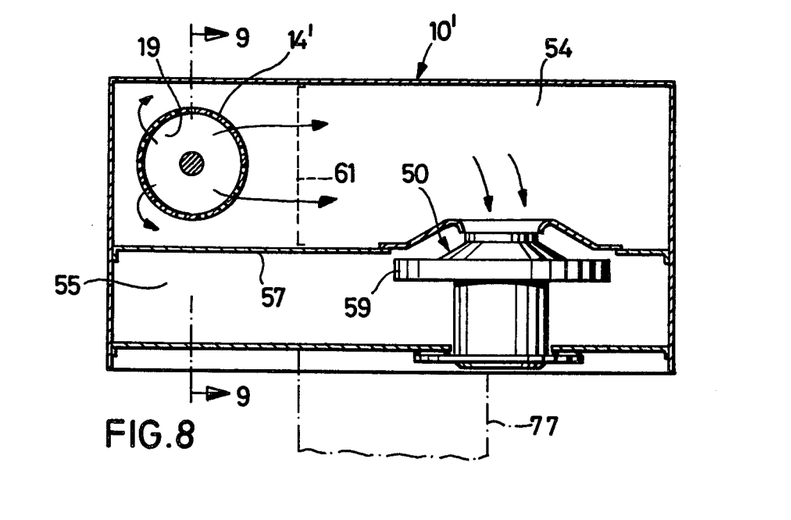
FIG. 8 is a cross-sectional view taken along the line 8—8 through the filtering apparatus according to FIG. 7.
Figure 9:
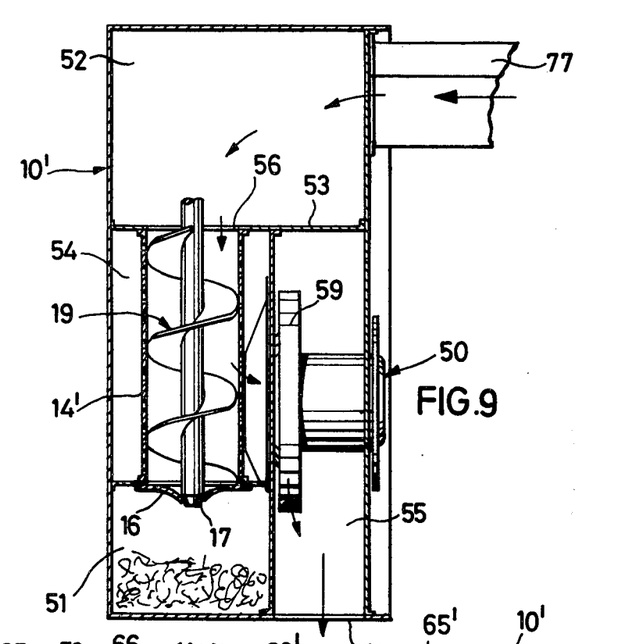
FIG. 9 is a cross-sectional view taken along the line 9—9 of FIG. 8 wherein the propulsion unit for the conveyer screw is omitted.

In the embodiment according to FIGS. 7-9, the fiber filtering assembly 13, and the conveyer screw 19 rotating therein, are, in principle, constructed as illustrated in FIG. 5, and require no further discussion. It is only noted that, in this exemplary embodiment, the propulsion motor 27 provided for the conveyer screw 19 is located in a separate compartment 70 in the housing 10'. The air flows into the housing 10' through the large rear inlet 32', to which connects a feeder duct 77. The air drawn into the housing 10' first reaches the upper throughflow chamber 52, which is separated by an intervening base 53 from the throughflow chambers 54, 55 located thereunder. A single hole 56 is provided in the itervening base 53, with which hole 56 the open face of the cylindrical filter 14' communicates, so that the air is drawn into the filter 14' from the upper chamber 52, and then through the filter and into the throughflow chamber 54 bound respectively on top and on the bottom by the intervening base 53 and the base of the housing. The throughflow chamber 54 is bound on the inside by a vertical intervening wall 57, into which the ventilator 50 is set with its suction opening. The impeller 59 of the ventilator 50 is located in the rear chamber 55 separated from the chamber 54 by the intervening wall 57, and is itself located beneath the intervening base 53. The impeller 59 drives the air through this chamber 55, from which it flows through a bottom opening 60. This bottom opening 60 can be aligned to communicate with an opening in the floor of the room of the given building, and can, for example, lead to an air exhaust duct of the climate system of the given building. The fiber stock filtered and compacted in the fiber filtering assembly 13 reaches the collecting chamber 51, separated from the chamber 54 by an air-tight wall 61, through the outlet 17 of the membrane 16, from which collecting chamber 51 the fiber stock is removed, for example, manually, from time to time. In this exemplary embodiment, the conveyer screw 19 is oriented vertically.

In the preceding exemplary embodiments, the respective interior of the fiber filtering assembly 13 is constructed to be rotationally symmetrical, which is exceedingly advantageous. However, it is also possible to construct it differently, preferably to construct it to be rotationally symmetrical only over a part of its axial length, and in particular to construct it rotationally not symmetrically in the end region neighboring the outlet for the fiber stock. Thus it can, for example, be useful in many cases to make the circumferential wall of the fiber filtering assembly rotationally non-symmetrical in the vertical region of the braking component or components, and instead construct it, for example, star-shaped in cross section featuring at least one inwardly directed spike. Such a spike, or the inwardly directed regions of the star-shaped pattern, can then be formed by braking components, which inhibit the rotation of the compacted fiber stock. Under some conditions a solely polygonal figure, for example, a square, triangle, or other polygonal figure of the circumferential wall of the compacted zone of the fiber filtering assembly also suffices to exert a sufficient braking effect upon the compacted fiber stock, wherein this region of the fiber filtering assembly can be constructed by means of an airproof wall and/or by means of a section of the filter.

Figure 10:
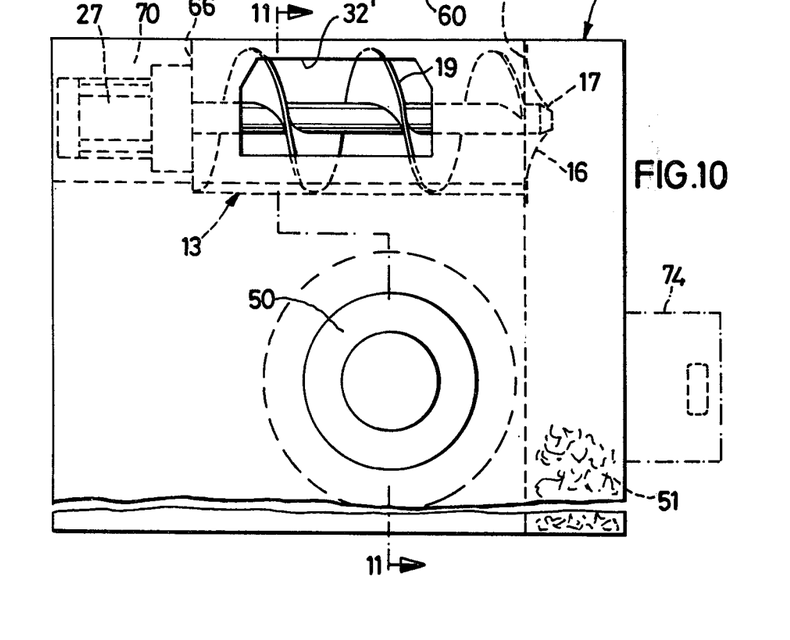
FIG. 10 illustrates a rear view of the filtering apparatus according to a further exemplary embodiment of the invention.
Figure 11:
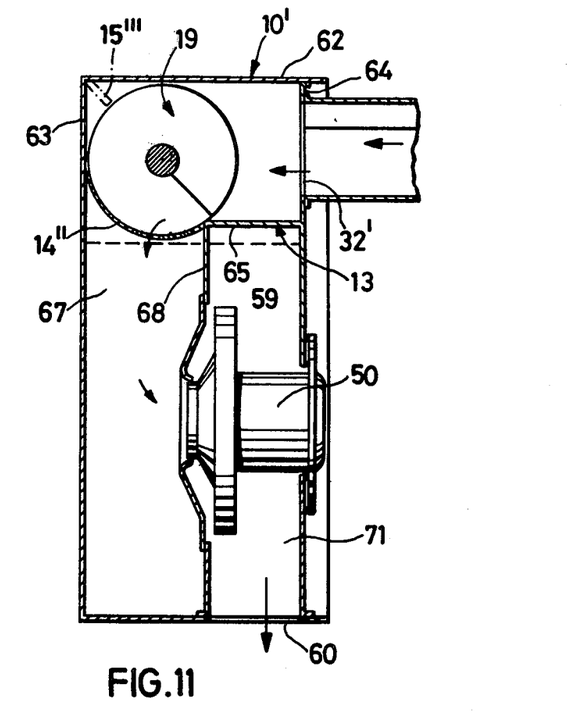
FIG. 11 is a cross-sectional view taken along the line 11—11 of FIG. 10.

In the exemplary embodiments according to FIGS. 10 and 11, the conveyer screw 19 is located in the box-shaped housing 10', and its axis of rotation is horizontal. Departing from the preceding embodiment, the fiber filtering assembly 13 is not constructed rotationally symmetrical, but rather formed by the flat exterior wall regions 62, 63 and 64 of the box-shaped housing 10', and by the flat interior wall regions 65, 66 in the housing 10', as well as by a filter 14" which is circular in shape and which extends in this exemplary embodiment over a radial sector of approximately 120 degrees, and by a face wall 65' containing the membrane 16. The conveyer screw 19 grazes this filter 14", and is driven by an electric motor 27 located in a separate compartment 70 of the housing 10'. A throughflow chamber 67 in the housing 10' mates to the exterior of the filter 14", and a side wall 68 located approximately in the middle of the housing 10' contains the suction opening of the ventilator 50, the impeller 59 of which blows air through the throughflow chamber 71 and downward and out through an air outlet 60 in the base of the housing 10'. The air inlet 32' of this housing 10' is located at the rear wall of the housing 10' and communicates directly with the fiber filtering assembly 13. In this exemplary embodiment, that given circumferential region of the conveyer screw 19 which does not lie next to the filter 14", is situated at some distance from the airproof wall regions 62–66. The air drawn into the filter 14" flows into the fiber filtering assembly 13 preferably perpendicularly relative to the rotational axis of the conveyer screw 19, and through it to the filter 14". Since this air flows into the conveyer screw over its entire free circumference, it inhibits the co-rotation with the conveyer screw of the fibers conveyed by the conveyer screw 19, so that the fibers are already conveyed along the filter 14" by the conveyer screw 19, and are already compacted in the region ahead of the outlet 17 due to the resistance offered by the membrane 16 forming the outlet 17. The membrane 16 can be constructed and arranged according to the preceding exemplary embodiments. Thus, compacted fiber stock is formed which falls into the volumetrically large collecting chamber 51 extending over the entire interior height of the housing 10', where it can be manually removed, from time to time, through an opening. The door which normally closes this opening is represented by the dashdotted line 74. The braking components for the braking of the rotation of the fiber stock can, in this exemplary embodiment, be formed solely by the filter 14" and the membrane 16, wherein the air flowing into the filter 14" cooperates to prevent the co-rotation with the conveyer screw 19 of the fibers present at the filter 14" and strongly compacted in the vicinity of the outlet 17. However, if required, one or several additional braking components can also be provided. For example, according to FIG. 11, a radial stip 15''' extending axially relative to the conveyer screw 19 and reaching from an edge of the wall of the fiber filtering assembly 13 toward and close to the conveyer screw 19 or grazing it, can usefully serve as the braking component, so that the fiber stock which reaches the space between the filter 14" and this strip 15''' is accumulated by this strip, and thus is certainly prevented from rotating, without being hindered in its motion in the axial direction of the conveyer screw 19. This accumulated fiber stock also prevents the rotation of other adjacent fiber stock with which it is entangled. This braking component 15''' can preferably extend along the entire conveyer screw 19, or it can also extend only opposite the end section of the conveyer screw 19, generally located in the vicinity of the outlet 17.

In the depicted exemplary embodiments, the fiber filtering assembly 13 has respectively one single filter. However, where appropriate, the fiber filtering assembly can also have several filters, for example, two or more mutually mating filters, or else filters that are mutually offset in the direction of the circumference. In addition, where appropriate, several such fiber filtering assemblies can be arranged in parallel or else one after the other in series.

In all of the preceding exemplary embodiments, the membrane 16 serves, among other purposes, for the axial braking of the compacted fiber stock. At its location other braking components, which brake the axial motion of the fiber stock, can also be provided, for example, transverse ribs or bends in the lower ends of the projections 15, or a rigid, preferably conical ring at the corresponding end face of the fiber filtering assembly. In the event that braking surfaces braking the rotation of the compacted fiber stock already create a sufficient degree of compaction, then the end face of the fiber filtering assembly neighboring these braking surfaces can also be open.

The invention also makes possible an automatic regulation of the pressure drop at the filter, wherein this pressure drop is sensed by a differential pressure sensor device, and is compared to a specified and preferably adjustable reference value to generate a reference deviation value, whereby the rotational velocity of the propulsion of the conveyer screw is automatically and preferably continuously variable in accordance with that reference deviation value, in order to regulate the pressure drop at the filter, wherein an automatic chronological stopping of the conveyer screw can preferably occur as well. In some circumstances, a two-point regulation can also be provided, wherein the propulsion of the conveyer screw is regulated by the regulator alternately to stop and to run for a single rotation.

What is claimed is:

1. A filter apparatus for removal of fibers from a stream of moving air comprising:
 a hollow casing having an air inlet for unfiltered air having fibers suspended therein and an air outlet for filtered air;

a fiber filtering assembly having an elongated hollow fiber filter positioned within said casing so as to define an unfiltered air chamber and a clean air chamber and having an inlet and an outlet axially spaced from each other, said inlet communicating with the casing inlet, said fiber filter having openings therethrough sized to trap fiber particles but permitting the flow of air therethrough to the casing outlet;

a screw conveyor having a helical flight of substantially the same radius as the inner surface of said fiber filter and which extends at least substantially the length of the hollow casing and positioned within said fiber filter and being substantially co-extensive therewith for providing means for axially displacing the fibers to the fiber filter outlet;

means defining an opening in said casing surrounding and adjacent to the fiber filter outlet;

flexible means supported on said casing and positioned adjacent said casing opening so as to at least partially close said casing opening; and means for driving said conveyor, whereby fibers trapped on the inner surface of said fiber filter are compacted and moved toward said flexible means until they exit from said filter outlet by flexing said flexible means to provide a discharge path for said fibers through the opening in said casing.

2. The apparatus as defined in claim 1, wherein the casing inlet is located relative to the screw conveyor so that the inlet air is directed perpendicular to the rotational axis of the screw conveyor, thereby causing the inlet air to pass around the circumference of said screw conveyor and prevent the co-rotation of the screw conveyor and said fibers.

3. A filtering apparatus for removal of fibers from a stream of moving air comprising:

a hollow casing having an air inlet for unfiltered air having fibers suspended therein and an air outlet for filtered air;

a fiber filtering assembly having an elongated hollow fiber filter positioned within said casing so as to define an unfiltered air chamber and a clean air chamber and having an inlet and an outlet at opposite ends thereof, said inlet communicating with the casing inlet, said fiber filter having openings therethrough sized to trap fiber particles but permitting the flow of air therethrough to the casing outlet;

a screw conveyor having a helical flight of substantially the same radius as the inner surface of said fiber filter and which extends at least substantially the length of the hollow casing and positioned within said fiber filter and being substantially co-extensive therewith for providing a spiral flow of the fibers to the fiber filter outlet;

brake means for impeding the rotary component of movement of fibers collected on the inner surface of said fiber filter and for converting the spiral flow of the fibers to an axial flow;

means defining an opening at one end of said casing surrounding and adjacent to the end of said conveyor having the fiber filter outlet;

flexible means having an opening concentric with said casing opening supported on said casing and positioned adjacent said casing opening, so as to close said casing opening; and means for driving said conveyor, whereby fibers trapped on the inner surface of said fiber filter are compacted and moved toward said flexible means until they exit from said fiber filter by flexing said flexible means outwardly of said opening to provide a discharge path.

4. A filtering apparatus as defined by claim 3 in which at least a portion of said helical conveyor flight is positioned close enough to the inner surface of a portion of said fiber filter to effect a cleaning thereof.

5. Filtering apparatus as defined by claim 3 wherein said helical flight has a constant pitch.

6. Filtering apparatus as defined by claim 3 wherein at least a portion of said helical flight has a pitch which decreases in the direction from the fiber filter inlet to the fiber filter outlet.

7. Filtering apparatus as defined by claim 3 in which said brake means are stationary.

8. Filtering apparatus defined by claim 3 in which said fiber filter is cylindrically shaped.

9. Filtering apparatus as defined by claim 3 in which said fiber filter is shaped as a truncated cone.

10. Filtering apparatus as defined by claim 3 wherein said braking means is located within said fiber filter.

11. Filtering apparatus as defined by claim 10 wherein said braking means comprises at least one projection protruding radially inwardly from the inner wall of said fiber filter.

12. Filtering apparatus as defined by claim 3 wherein said braking means is connected to the casing and is located at least partially exteriorly of said fiber filter adjacent the fiber outlet.

13. Filtering apparatus as defined by claim 3 in which said casing air inlet is disposed with respect to said fiber casing so that the unfiltered air enters the helical path defined by said fiber filter and screw conveyor in a direction opposite to the direction of rotation of said conveyor, whereby the fibers are maintained in constant movement in said fiber filter.

14. Filtering apparatus as defined by claim 3, further comprising: means for mounting said screw conveyor to the casing for limited axial movement in response to fiber buildup in said fiber filter; and means responsive to said axial movement for temporarily reversing the direction of rotation of said conveyor.

15. Filtering apparatus as defined by claim 3, further comprising: means for mounting said screw conveyor to the casing for limited axial movement in response to fiber buildup in said fiber filter; and means responsive to such axial movement for stopping rotation of said conveyor.

16. Filtering apparatus as defined by claim 3 wherein said means for driving said conveyor is an electric motor and means mounting said motor on said casing for limited rotation about its own axis in response to overloads on said conveyor and including means responsive to such limited rotation of said motor housing to reverse the direction of rotation of said motor.

17. Filtering apparatus as defined by claim 3 in which said means for driving said conveyor is an electric motor and means mounting said motor on said casing for limited rotation about its own axis in response to overloads on said conveyor and including means responsive to such limited rotation of said housing to de-energize said motor.

18. Filtering apparatus as defined by claim 3 and including a suction ventilator connected to said air outlet for positively circulating air to be filtered through said apparatus.

19. Filtering apparatus as defined by claim 3 wherein said screw conveyor is vertically disposed and counterbalanced within said casing.

20. Filtering apparatus as defined by claim 3 including means for maintaining a desired pressure drop across said fiber filter by varying the speed of said conveyor drive means.

21. Filtering apparatus as defined by claim 3 and including means for continuously varying the speed of said drive means.

22. Filtering apparatus as defined by claim 3 and including means for switching the speed of said drive means between two levels.

23. Filtering apparatus as defined in claim 3 wherein the flexible means comprises a membrane.

24. Filtering apparatus as defined in claim 3 wherein the brake means comprises at least one row of projections which are angularly offset from one another in the circumferential direction of the fiber filtering assembly.

* * * * *